United States Patent

[11] 3,540,756

| [72] | Inventors | Richard W. Stout<br>Elkhart;<br>Milton J. Brunk, Goshen, Indiana |
|---|---|---|
| [21] | Appl. No. | 678,389 |
| [22] | Filed | Oct. 26, 1967 |
| [45] | Patented | Nov. 17, 1970 |
| [73] | Assignee | Stoutco, Inc.<br>Bristol, Indiana |

[54] AXLED VEHICLE SUPPORT FRAME ASSEMBLY
4 Claims, 7 Drawing Figs.

[52] U.S. Cl.................................................... 280/106.5,
267/54
[51] Int. Cl..................................................... B62d 21/00
[50] Field of Search........................................... 280/106,
106.5; 267/54

[56] References Cited
UNITED STATES PATENTS

| 2,337,281 | 12/1943 | Sherman | 280/106.5 |
| 2,869,890 | 1/1959 | Benning | 280/106.5 |
| 3,022,991 | 2/1962 | Billard | 267/54 |

Primary Examiner—Philip Goodman
Attorney—Eugene C. Knoblock

ABSTRACT: A vehicle support frame assembly having skirted or flared spring support members to accommodate flexing of the spring assembly and having angled internal cross support members supported by the spring support member and supporting in turn the perimeter vehicle frame.

Patented Nov. 17, 1970

INVENTOR.
RICHARD W. STOUT
BY & MILTON J. BRUNK

Eugene O. Knoblock
ATTORNEY

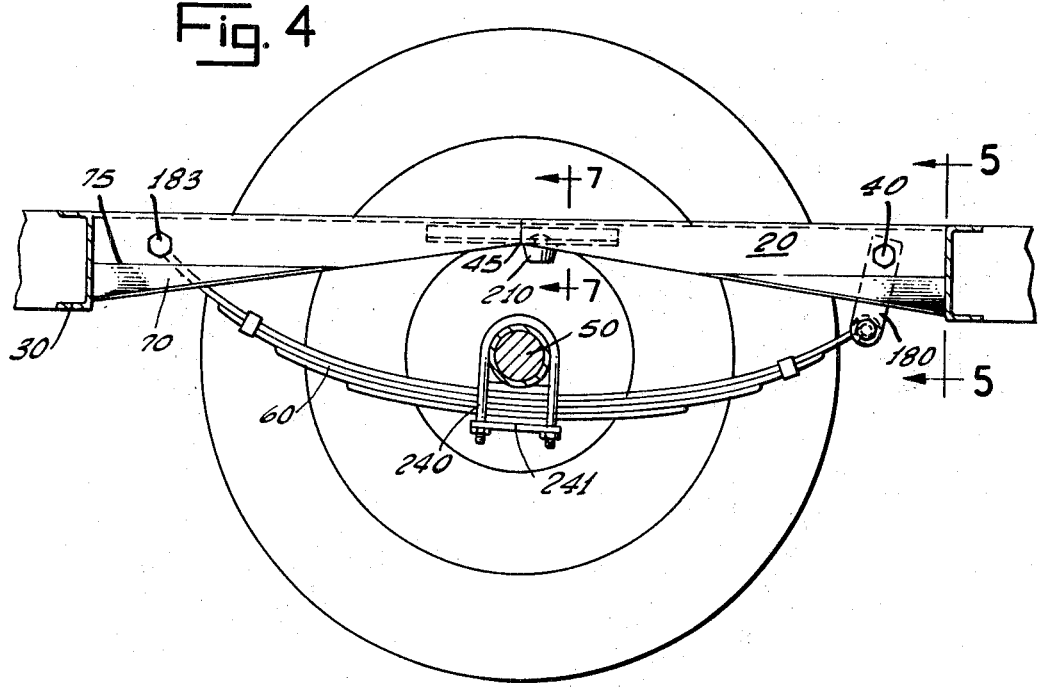
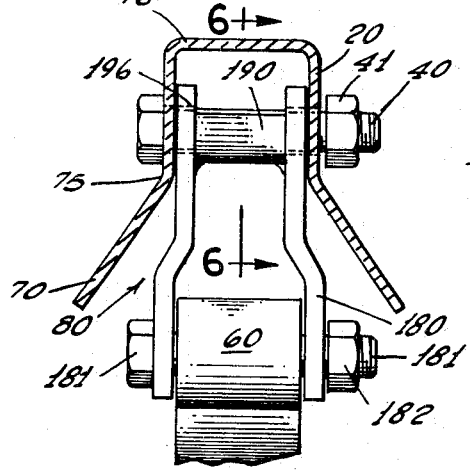
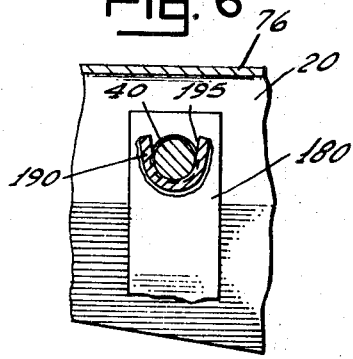
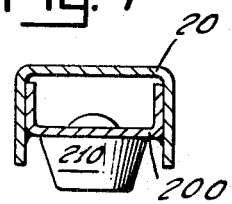
INVENTOR.
RICHARD W. STOUT
& MILTON J. BRUNK
ATTORNEY

3,540,756

AXLED VEHICLE SUPPORT FRAME ASSEMBLY

BACKGROUND OF THE INVENTION

This invention pertains to the field of vehicle frame construction.

Certain axled towed vehicles such as collapsible campers and small open bed trailers present a need for a low-profiled structure in order to provide adequate rear vision by the driver of a towing vehicle and to present a low center of gravity and reduce the possibility of upset when being towed. Prior art devices have thus far been unable to produce this low profile because of the necessity of allowing ample room between the frame and the axle of the vehicle for unrestricted support spring flexure while the trailer traverses rough terrain. Also the prior art devices, in order to provide sufficient structural support for the camper or trailer body, have utilized diagonal supports in the frame construction thereby adding to the weight of a support frame and its cost. The present invention overcomes these above-mentioned deficiencies by providing a frame of low profile, with ample spring clearance, which is of light weight construction and high strength.

SUMMARY OF THE INVENTION

This invention pertains to a vehicle frame adapted to support collapsible campers, low-bed trailers, and like vehicles, wherein each support spring is flexibly attached to an inverted longitudinal channel having a portion of its sides formed in a divergent flare or skirted manner, thereby allowing a connected spring shackle to swing thereon to accommodate spring flexing without interference with the inverted channel. The inverted channel or longitudinal support members are secured at their ends to cross support members. The cross support members in turn support the perimeter bed frame. The sides or flanges of the longitudinal spring support members are of reduced height or vertical dimension and of strong box section over the approximate axle centerline and the channel tapers and progressively increases in vertical dimension from the reduced central portion to the ends thereof. Additionally, the cross support members extend in the horizontal plane from the longitudinal support members to the longitudinal members of the perimeter frame at angles other than right angles.

By utilizing longitudinal support members of reduced depth over the axle area, the axle and support spring may be assembled in close proximity to the support member thereby allowing the frame to assume a low profile. By divergently positioning the sides or flanges of the end portions of the longitudinal support member, the spring shackle and spring are provided ample room or clearance to accommodate flexure without contacting the support member. Also, the divergent position of the sides or flanges of a support member provides a strong and structurally secure joint with the cross support member. No additional support apparatus such as spring hangers is necessary. By providing a support frame assembly as above described the supported camper or trailer body is of sufficiently low profile to permit rear vision by an operator through the rear window of a towing vehicle during transportation and to permit ease of access by users when being assembled or disassembled, as in the case of the camper, or when being loaded or unloaded as in the case of a small open bed or utility trailer.

Accordingly, it is an object of this invention to provide an axled vehicle frame assembly of low profile.

It is a further object of this invention to provide a lightweight, axled-vehicle frame assembly of high structural strength.

Further objects will become apparent upon a reading of the invention's description.

BRIEF DESCRIPTION OF THE DRAWINGS

A preferred embodiment of this invention has been chosen for the purposes of illustration and description wherein:

FIG. 4 is an enlarged longitudinal sectional view of the frame and wheel assembly with the springs in an unflexed position.

FIG. 5 is an enlarged vertical transverse sectional view taken along line 5-5 of FIG. 4 showing the longitudinal support member and spring shackle arrangement.

FIG. 6 is an enlarged longitudinal detail sectional view taken along line 6-6 of FIG. 5 showing the upper shackle arrangement.

FIG. 7 is a sectional view taken along line 7-7 of FIG. 4 showing the longitudinal support member and internal brace.

DESCRIPTION OF THE PREFERRED EMBODIMENT

Figure 1:
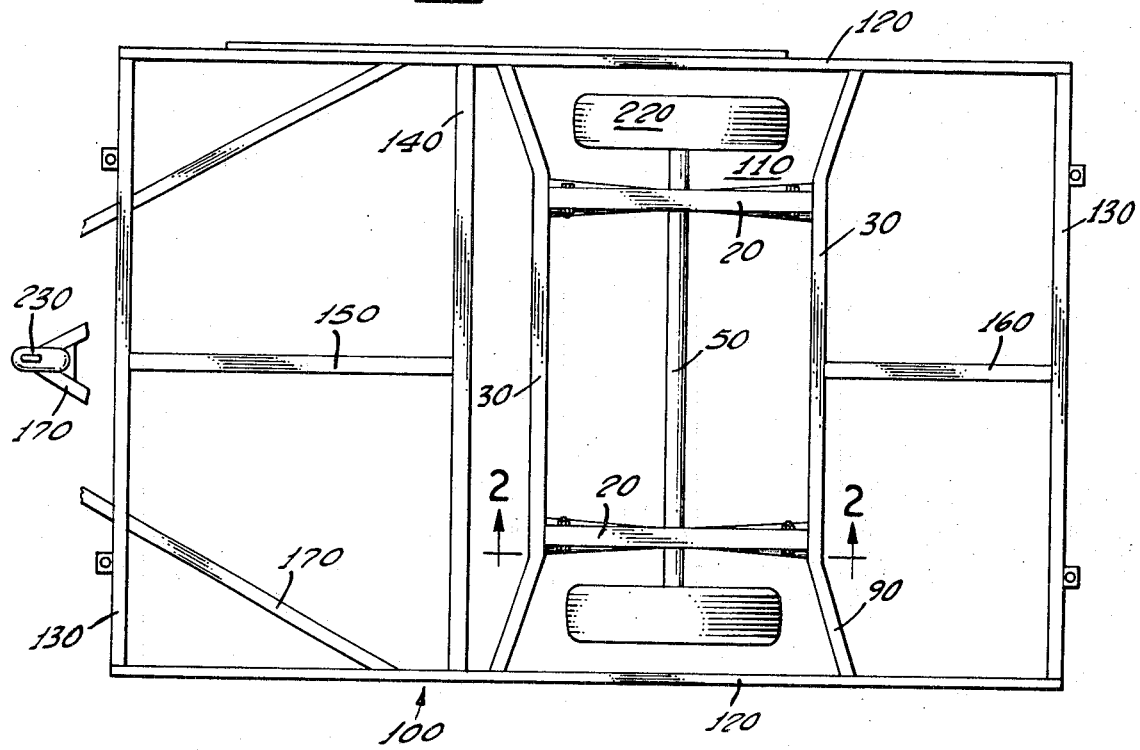
FIG. 1 is a horizontal plan view of the frame and wheel assemblies depicting this invention.
Figure 2:
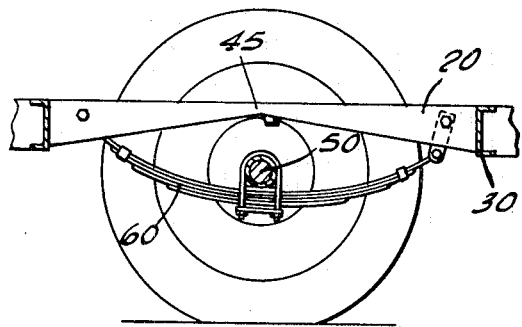
FIG. 2 is a longitudinal vertical sectional view taken along line 2-2 of FIG. 1 showing the frame and wheel assembly when the springs are in an unflexed position.

The preferred embodiment illustrated is not intended to be exhaustive or to limit the invention to the precise form disclosed. It is chosen and described in order to best explain the principles of the invention and the application and practical use to thereby enable others skilled in the art to best utilize the invention in various embodiments and modifications as are best adapted to the particular use contemplated.

The preferred embodiment of this invention consists of a perimeter trailer frame 100 having longitudinal members 120, transverse members 130 and inner members in a modified H-shape, including two longitudinal support members 20 are of an inverted channel or U-shape, welded or otherwise fixedly joined at each end to cross support members 30 which traverse the width of the frame and are secured to longitudinal frame members 120. At one end of each longitudinal support member 20 is an aperture which accommodates a spring shackle bolt 40.

The portion 45 of the sides or flanges of the longitudinal support member 20 located above the vehicle axle 50 is of reduced height or depth to accommodate flexing of the support spring 60 without axle contact with longitudinal support member 20. From this section 45 of reduced height the sides or flanges of the longitudinal support member 20 to the outer ends thereof become progressively deeper.

Additionally, the outer ends of the sides or flanges of the longitudinal support member 20 are bent outwardly along a longitudinal line 75 to provide downwardly diverging flange or skirt parts 70 just below and adjacent to the spring shackle bolt 40. The bend line 75 of each skirt part 70 may lie along a line parallel with the top or web 76 of the longitudinal support member 20. The skirt parts 70 may be angled from 30 to 60° from the horizontal, providing ample room for the pivotal movement of a spring shackle 80 relative to member 20 upon flexing of spring 60 without having contact of either spring or shackle with the longitudinal support member 20.

The longitudinal support members 20 are preferably symmetrically disposed and parallel, with the ends thereof welded or otherwise secured to the cross support members 30. The longitudinal support members 20 are preferably of equal length and are disposed substantially at right angles to the parts of the two cross support members 30 to which they are welded. The cross support members 30 may consist of channels or other structural elements which the ends of the longitudinal support members 20 abut and to which they are welded. The entire end of the longitudinal support member 20 including the skirt portions 70 thereof is preferably fixably attached to each cross support member so that the skirt portions 70, being inclined, provide horizontal as well as vertical support for the joint, thereby eliminating the need for separate diagonal braces at the junctions of the longitudinal support members and cross support members.

The perimeter frame 100 of the frame assembly consists of two longitudinal members 120 and two transverse members 130 welded or otherwise secured together and forming a rectangular configuration. The cross support members 30 preferably are bent and have angularly extending end portions 90 between the longitudinal support members 20 and the perimeter frame members 120. The end portions 90 abut and are fixedly secured to the longitudinal members 120 of the perimeter frame 100 and are angled in the horizontal plane of the frame at selected angles in a selected range, as from 85° to 110° from the longitudinal support member 20. The extended end portions 90 of the cross support members at each side of the frame preferably diverge laterally whereby the support capability of the spring and axle assembly is distributed over widely spaced parts of the perimeter frame 100. Also that area bounded by the extended end portions 90 of the cross support members 30, a longitudinal support member 20 and a portion of the longitudinal members 120 of the perimeter frame 100 provides a wheel cavity 110 for a vehicle wheel and tire 220.

The longitudinal members 120 and the transverse members 130 of the perimeter frame 100 may be further braced and strengthened. Thus a cross member 140 may have its end portions fixedly secured to the longitudinal members, preferably forwardly of the cross support members 30. Longitudinal brace 150 may be mounted along the centerline of the trailer to extend from and connect front transverse member 130 to the cross member 140. A second longitudinal brace 160 may extend along the centerline of the trailer to interconnect the rear transverse member 130 and the rear cross support member 30. Two diagonal forwardly projecting converging supports 170 may be provided. Each diagonal support may be secured at spaced points thereof to a longitudinal member 120 and the front transverse member 130, with their forward ends terminating at coupler or hitch 230 to define the usual A frame.

Referring now to FIG. 5 it can be seen that a shackle bolt 40 extends between the flanges of the longitudinal support member 20 and passes through and suspends the upper ends of the shackle sideplates 180. Between shackle sideplates 180 and fixedly attached thereto is a spacer 190 preferably of U-shape which engages the shackle support bolt 40. The interior surface 195 of the spacer 190 is preferably substantially concentric with and of smaller radius than shackle bolt apertures 196 in the plates 180. In this manner, as flexing of the support springs causes the shackles to oscillate, substantially the entire vertical bearing contact between the shackle 80 and longitudinal support member 20 takes place between the cradle interior surface 195 and the shackle support bolt 40. The support bolt 40 is preferably fixedly mounted to the longitudinal support member 20, either by splining or by welding, so as to prevent rotation of the bolt with respect to the support member 20 and is held in place by nut 41. One end of the support spring 60 is pivotally connected to the lower ends of the shackle sideplates 180 by bolt 181 held in place by nut 182. The spring 60 is preferably a leaf spring and is pivotally connected to the opposite end of the longitudinal support member 20 by a bolt 183. Axle 50 may be attached to the support springs 60 in the customary manner, which may consist of U-bolts 240 and retainer plate 241 passing around the axle and the spring.

To strengthen the longitudinal support members 20 at the reduced depth central portions thereof above the axle, a brace 200 is welded or secured thereto. This brace 200 may be a channel fitting snugly within the longitudinal support member 20 and is welded or otherwise fixedly secured thereto. This additional support brace 200 does not traverse the entire length of the longitudinal support member 20 but is of sufficient length to reinforce member 20 to compensate for the reduced depth thereof at its center. Also attached to each longitudinal support member 20 is a rubber or resilient bumper or stop 210 engageable by the axle 50 upon maximum deflection of the spring 60.

Figure 3:
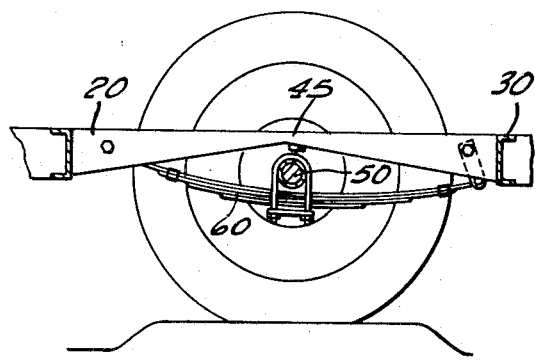
FIG. 3 is a longitudinal vertical sectional view taken along line 2-2 of FIG. 1 showing the wheel and frame assembly when the springs are in a flexed position.

In operation, as the springs are flexed to absorb road shock, the shackles assume the position as indicated in FIG. 3. Due to the downwardly diverging skirt portions 70 of the longitudinal support members 20, there is no contact by the shackle 80 with the longitudinal support members.

It can be readily seen that by having a longitudinal support member 20 of reduced height at its center above the axle and by utilizing the diverging skirt portions 70 of the members, the axle and wheel can assume a close relationship to the frame bed thereby permitting a low profile of the trailer frame. Also the diverging skirt portions 70 of the longitudinal support members 20 provide adequate strength and rigidity at the connections or securements between the longitudinal support members 20 and cross support members 30 without the need for diagonal braces or like supports. It should also be noted that the longitudinal frame members 120 are attached to only the cross support members 30 and the member 140, thus allowing ample space for the trailer wheels and for the attachment of spring and axle assemblies. It will be understood that the perimeter frame attached to the cross support members may assume many varied configurations depending upon the load-carrying requirements, size and intended usage of the trailer. Another advantage of this type of frame is that in utilizing the divergent skirt portions of the longitudinal support members 20, the vertical height of said support members may be held at a minimum for the structural strength. By cradling the support bolt 40 in the spring shackle 80, the area of contact between the bolt and shackle is given greater distribution thus decreasing wear and increasing strength.

It will be understood that the invention is not to be limited to the details herein given but it may be modified within the scope of the appended claims.

We claim:

1. An axled-vehicle support frame assembly comprising:
two cross support members;
two spaced-apart parallel longitudinal support members disposed between said cross support members and fixedly secured thereto, each longitudinal support member constituting an inverted channel having spaced depending side flanges with axially aligned apertures therein;
a pair of leaf springs;
means connecting the ends of each spring to opposite end portions of a longitudinal support member, said spring connecting means including a bolt extending through the axially aligned apertures in the side flanges of each longitudinal support member;
a spring shackle carried by a said bolt between the side flanges of each longitudinal support member;
a perimeter frame secured to the opposite ends of said cross support members and disposed in substantially the same plane as said cross support members and longitudinal support members;
said side flanges of each longitudinal support member having a reduced depth over the axle so as to permit maximum axle displacement without frame interferences; and
the depth of said side flanges increasing progressively from the reduced depth portion over the axle to adjacent the ends of said longitudinal support members.

2. An axled-vehicle support frame assembly comprising:
two cross support members;
two spaced-apart parallel longitudinal support members disposed between said cross support members and fixedly secured thereto, each longitudinal support member constituting an inverted channel having spaced depending side flanges with axially aligned apertures therein;
a pair of leaf springs;
means connecting the ends of each spring to opposite end portions of a longitudinal support member, said spring connecting means including a bolt extending through the axially aligned apertures in the side flanges of each longitudinal support member;
a spring shackle carried by a said bolt between the side flanges of each longitudinal support member;
a perimeter frame secured to the opposite ends of said cross support members and disposed in substantially the same plane as said cross support members and longitudinal support members; and
said side flanges of each longitudinal support member diverging downwardly and outwardly whereby the spring shackle has clearance with said side flanges on spring deflection and said side flanges provide configured structural support at the securement of the longitudinal support members to the cross support members.

3. The axled-vehicle support frame assembly of claim 2, wherein the portion of each cross support member between said perimeter frame and the adjacent longitudinal support member extends at an angle different than 90° from said longitudinal support member and the perimeter frame part to which it is connected.

4. An axled-vehicle support frame assembly comprising:

two cross support members;

two spaced-apart parallel longitudinal support members disposed between said cross support members and fixedly secured thereto, each longitudinal support member constituting an inverted channel having spaced depending side flanges with axially aligned apertures therein;

a pair of leaf springs;

means connecting the ends of each spring to opposite end portions of a longitudinal support members, said spring connecting means including a bolt extending through the axially aligned apertures in the side flanges of each longitudinal support member;

a spring shackle carried by a said bolt between the side flanges of each longitudinal support member;

a perimeter frame secured to the opposite ends of said cross support members and disposed in substantially the same plane as said cross support members and longitudinal support members; and said spring shackle including spaced apart sideplates disposed between said side flanges and a spacer of U-shaped cross section extending between and connecting said shackle plates, said shackle-carrying bolt cradled by said spacer.